(12) United States Patent
Kremerman

(10) Patent No.: US 10,967,292 B1
(45) Date of Patent: Apr. 6, 2021

(54) DISTILLATION TUBE AND FRACTION COLLECTOR WITH CONCAVE INTERIOR WALL

(71) Applicant: Elliot Kremerman, Los Gatos, CA (US)

(72) Inventor: Elliot Kremerman, Los Gatos, CA (US)

( * ) Notice: Subject to any disclaimer, the term of this patent is extended or adjusted under 35 U.S.C. 154(b) by 0 days.

(21) Appl. No.: 17/143,986

(22) Filed: Jan. 7, 2021

(51) Int. Cl.
*B01D 3/32* (2006.01)
*B01D 5/00* (2006.01)
*B01D 3/14* (2006.01)

(52) U.S. Cl.
CPC .............. *B01D 3/32* (2013.01); *B01D 3/143* (2013.01); *B01D 5/009* (2013.01); *B01D 5/0063* (2013.01)

(58) Field of Classification Search
None
See application file for complete search history.

(56) References Cited

U.S. PATENT DOCUMENTS

| | | | |
|---|---|---|---|
| 2,293,257 A | 8/1942 | Gunn ...................... | B01D 3/42 137/262 |
| 2,427,142 A | 9/1947 | Hornbacher ......... | G01N 25/145 165/73 |
| 2,582,969 A | 1/1952 | Dinsmore ............... | B01L 3/569 165/177 |
| 3,020,211 A | 2/1962 | Smith .................... | B01D 1/225 203/72 |
| 3,334,966 A | 8/1967 | Shepherd .............. | C01B 35/068 423/294 |
| 3,340,157 A | 9/1967 | Weiss ................... | B01D 1/0017 202/180 |
| 3,416,999 A | 12/1968 | Shepherd .................. | C01B 6/10 202/161 |
| 3,607,662 A | 9/1971 | Glover ................. | B01D 5/0045 202/160 |
| 4,235,677 A | 11/1980 | Karamian ............ | B01D 5/0006 137/251.1 |
| 4,437,937 A | 3/1984 | McGraw .................. | B01D 3/28 202/160 |
| 4,471,836 A | 9/1984 | Hokanson ................. | F28B 9/10 165/111 |
| 5,076,349 A | 12/1991 | Kadono ............... | B01D 5/0042 165/111 |

(Continued)

*Primary Examiner* — Derek N Mueller
(74) *Attorney, Agent, or Firm* — Michael J. Feigin, Esq.; Feigin and Fridman LLC

(57) ABSTRACT

A distillation apparatus has a fraction collector with an internal region surrounded by a concave wall with portals. An inner wall of a lower vertical tube extends downward from the concave wall. An outer wall of the lower vertical tube surrounds a portion of a vertical extent of the inner wall and extends downward from a portion of the fraction collector exterior to the concave wall. A cooling channel extends from above into a portion of the fraction collector interior to the concave wall. An outer shell substantially covers the fraction collector, a portion of a vertical extent of the inner and outer walls of the vertical tube, and a portion of a vertical extent of the cooling channel, excepting for a lower portal from which a portion of a vertical extent of the inner and outer walls of the vertical tube extend, an upper portal from which a portion of a vertical extent of the cooling channel extends, and a side portal.

17 Claims, 7 Drawing Sheets

(56) References Cited

U.S. PATENT DOCUMENTS

| | | | |
|---|---|---|---|
| 5,885,313 A | 3/1999 | Okamoto | B01D 3/085 55/315.2 |
| 5,951,825 A | 9/1999 | Land | B01D 5/0006 202/185.3 |
| 9,895,626 B2 | 2/2018 | Kremerman | B01J 19/30 |
| 10,029,188 B2 | 7/2018 | Kremerman | B01D 3/085 |
| 10,279,281 B2 | 5/2019 | Kremerman | B01D 3/143 |
| 10,406,451 B2 | 9/2019 | Maibach | B01D 3/16 |
| 10,493,374 B2 | 12/2019 | Wells | B01D 5/006 |
| 10,751,638 B2 | 8/2020 | Maibach, Jr. | B01D 5/0087 |
| 2015/0367250 A1 | 12/2015 | Alstin | B01D 5/0063 202/170 |
| 2018/0065060 A1 | 3/2018 | Wells | B01D 3/12 |
| 2018/0161693 A1* | 6/2018 | Kremerman | B01D 5/006 |
| 2018/0290074 A1 | 10/2018 | Kremerman | B01D 3/085 |
| 2019/0076752 A1 | 3/2019 | Maibach | B01D 5/006 |

* cited by examiner

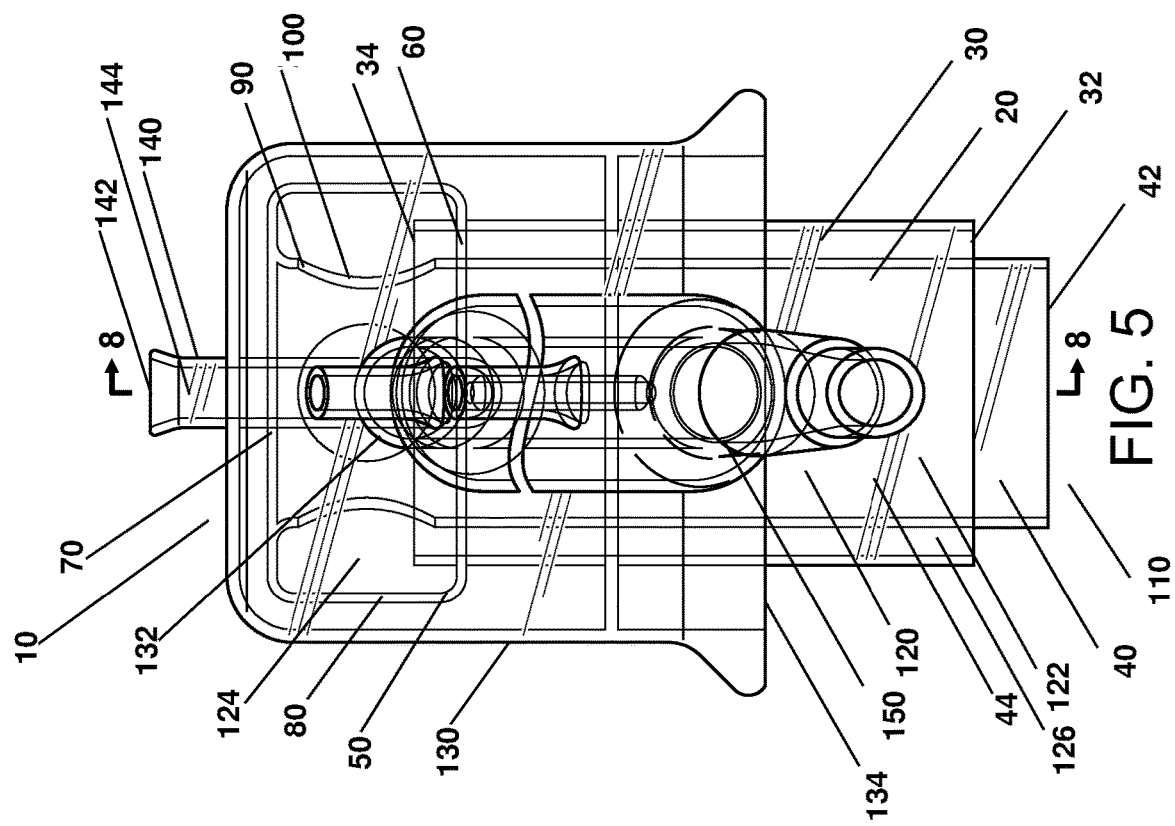
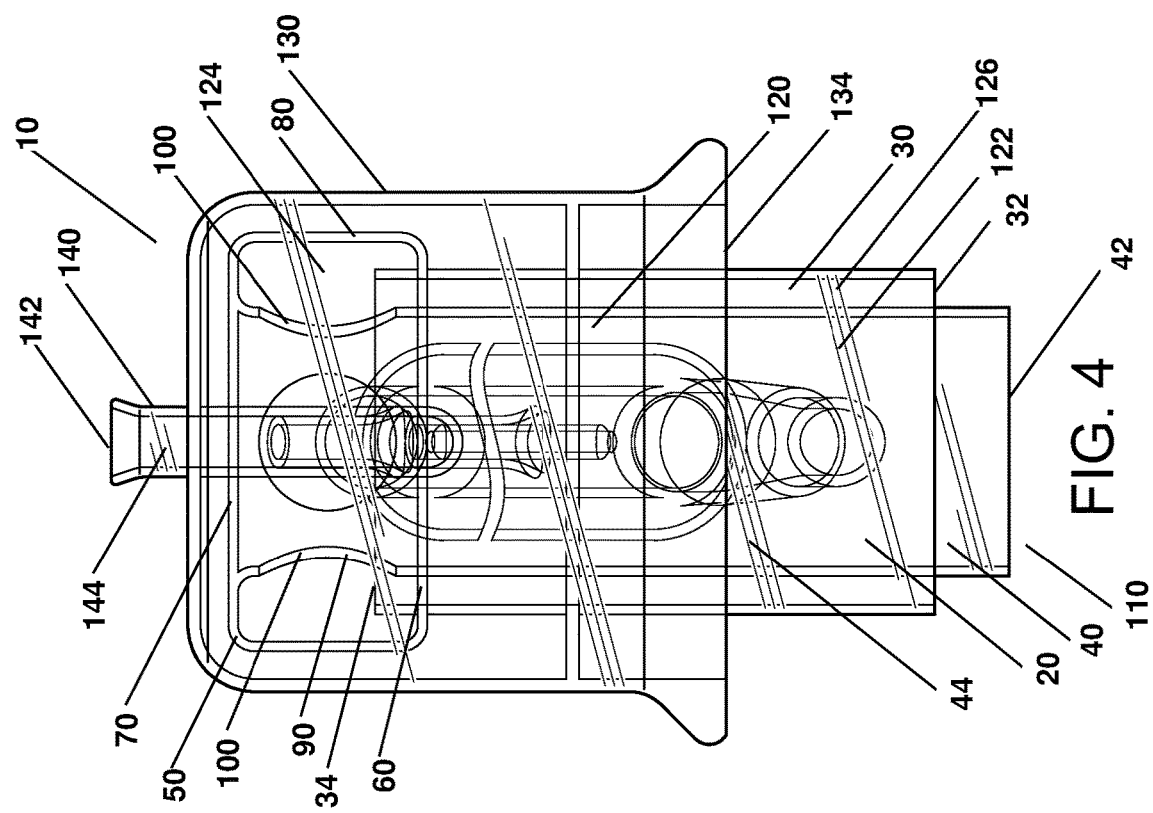

DISTILLATION TUBE AND FRACTION COLLECTOR WITH CONCAVE INTERIOR WALL

FIELD OF THE DISCLOSED TECHNOLOGY

The disclosed technology relates generally to distillation and, more specifically, to distillation equipment with a fraction collector.

BACKGROUND

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

The terms "top" and "bottom" refer to a direction of a pull of gravity. The "bottom" point is that which is closed towards the direction of pull of gravity (such as the center of the Earth) whereas the "top" point is furthest therefrom such that gravity pulls from high to low. Thus, a distillation head of embodiments of the disclosed technology has a vertical tube extending into a fraction collector. The fraction collector is a part of glassware (or other material) which an interior space which is entered into and extends below an upper most extent of a vertical tube, and a side exit portal aligned with a bottom-most extent of the fraction collector and being lower than an upper most extent of the vertical tube.

The fraction collector has a side portal and/or exit region attached to a condenser or other device which can form a unitary or separate structure with/to the distillation head. An "exit region" is defined as a portion with a bottom side extending past vertical extends of glassware between the interior space of the fraction collector and another element of the glassware; the "exit region" can be a single vertical plane or have a horizontal extent. The condenser, in embodiments of the disclosed technology, is external to the fraction collector and connects thereto by way of the exit region there-between. The exit region can be perpendicular to the vertical tube. The fraction collector is free from obstruction (unencumbered) other than the vertical tube forming a shelf (top edge of the vertical tube) therein.

A distillation device of embodiments of the disclosed technology has a vertical tube with an outer wall and an inner wall. The outer wall surrounds a majority of the inner wall. A fraction collector extends above the vertical tube. An upper section of the inner and outer walls of the vertical tube extend through a bottom side of the fraction collector and into a region of the fraction collector. The fraction collector is defined by at least a part of an upper wall, at least a part of a side wall, and at least a part of a bottom wall. A "fraction collector" is defined as a portion in which distillate fractions, gaseous and/or liquid, are gathered or collected.

"Inner", "interior", "outer", and "exterior" are defined relative to a theoretical line extending through a longest internal section of the vertical tube of the distillation device while remaining parallel to the walls of the inner and outer tubes, wherein that which is relatively closer, concentrically, to the line is defined as "inner" and/or "interior" and that which is relatively further, concentrically, from the line is defined as "outer" and/or "exterior". "Vertical" is defined as being in a plane which lies within a longest internal section of the vertical tube of the distillation device while remaining parallel to the walls of the inner and outer tubes.

Directional words such as "below", "above", "top", "bottom", "up", and "down" should be understood in a configuration wherein a majority of the vertical tube is below a majority of the fraction collector. A tube is defined as a segment having a single, curved wall, wherein every cross-section lying in a plane perpendicular to a plane which lies within a longest internal section of the tube while remaining parallel to the wall of tube is substantially identical and substantially circular.

In some embodiments, the inner wall continues into a concave wall, which in turn continues to the top side of the fraction collector. The concave wall may have at least one portal extending there-through.

"Concave" is defined as having, at each cross-section in a vertical plane thereof, an arc, wherein a midpoint of the arc is more inner than either one or both of the endpoints thereof.

In some variations of the disclosed technology, a portion of an interior of the vertical tube which is defined by the inner wall of the vertical tube and a portion of an interior of the fraction collector which is defined by the concave wall and the side wall thereof allow air and/or liquid flow between each other only through the at least one portal of the concave wall.

In some embodiments, each of the inner wall and the outer wall surround respective concentric lower openings. A space between the inner and outer walls may be open to the fraction collector and to an exterior lower opening of the concentric lower openings. Furthermore, in various embodiments, a region of the fraction collector which is exterior to the concave wall opens into a region between the inner and outer walls of the vertical tube, which, in turn, is open to a bottom side of the distillation device.

In some embodiments of the disclosed technology, the outer wall of the vertical tube surrounds a part of the concave wall. The inner wall of the vertical tube may also extend further downwards than the outer wall. The outer wall, in some versions, partially surrounds the at least one portal of the concave wall.

Stated differently, a distillation apparatus of embodiments of the disclosed technology has a continuous inner wall with a vertical portion and a concave portion, with at least one portal opening within the concave portion. A fraction collector surrounds the concave portion, and an outer wall surrounds at least a majority of the inner wall, or at least a majority of a vertical portion of the inner wall. Between the vertical portion and/or the concave portion of the continuous inner wall and the outer wall there exists at least one hollow space. "Continuous" is defined as being unbroken but for defined portals, notwithstanding changes in concavity. It should further be understood that "concave portion" describes a portion of a continuous vertically extending wall, the concave portion being at a top end of the vertical wall and which has a concave region. When referred to as a "concave wall" this is a wall with a concave shape which extends into the vertical wall.

In some embodiments, a first opening of the at least one hollow space is an opening to the fraction collector, and is exterior to the concave portion of the inner wall. A second opening of the at least one hollow space may be an opening at a bottom of the distillation apparatus.

There may further be an opening at a bottom end of the distillation apparatus which is circumscribed by the inner wall and which extends further downwards than the second opening at the bottom of the distillation apparatus.

In some versions, a shell surrounds a part of the inner wall, a part of the outer wall, the fraction collector, and the concave portion. The shell may have only two portals, namely, a lower portal and a side portal. The side portal, in various embodiments, opens into the fraction collector.

A "distillation head" is defined as a device in which vapors of a solid, liquid, or combination solid and liquid product to be distilled move upwards therein before exiting into a distribution adapter or condenser. "Distillate" refers to and is defined as the vapor, liquid, or combination thereof which exits, by way of the fraction collector, from the distillation head and is ultimately fractionally distilled into component parts, each component part having different physical properties such as a different boiling point. For purposes of this disclosure, material packing is synonymous with "Raschig rings" and are defined as inert packing material which stays structurally intact through changes in temperature and passage of vapors there-around during fractional distillation. Interior extending flanges fixedly attached to an inside of the vertical tube can also be used in embodiments of the disclosed technology.

Any device or step to a method described in this disclosure can comprise, or consist of, that which it is a part of, or the parts which make up the device or step. The term "and/or" is inclusive of the items which it joins linguistically and each item by itself. Any element or described portion of the devices shown can be "substantially" as such, if used in the claims in this manner. Where used, "substantially" is defined as "within a 5% tolerance level thereof."

BRIEF DESCRIPTION OF THE DRAWINGS

FIG. 4 is a right side elevation view of the distillation tube of FIG. 1.

FIG. 5 is a left side elevation view of the distillation tube of FIG. 1.

DETAILED DESCRIPTION OF EMBODIMENTS OF THE DISCLOSED TECHNOLOGY

A distillation apparatus has a fraction collector with an internal region surrounded by a concave wall with portals. An inner wall of a lower vertical tube extends downward from the concave wall. An outer wall of the lower vertical tube surrounds a portion of a vertical extent of the inner wall and extends downward from a portion of the fraction collector exterior to the concave wall. A cooling channel extends from above into a portion of the fraction collector interior to the concave wall. An outer shell substantially covers the fraction collector, a portion of a vertical extent of the inner and outer walls of the vertical tube, and a portion of a vertical extent of the cooling channel, excepting for a lower portal from which a portion of a vertical extent of the inner and outer walls of the vertical tube extend, an upper portal from which a portion of a vertical extent of the cooling channel extends, and a side portal.

Embodiments of the disclosed technology will become more clear in view of the following discussion of the figures.

Figure 1:
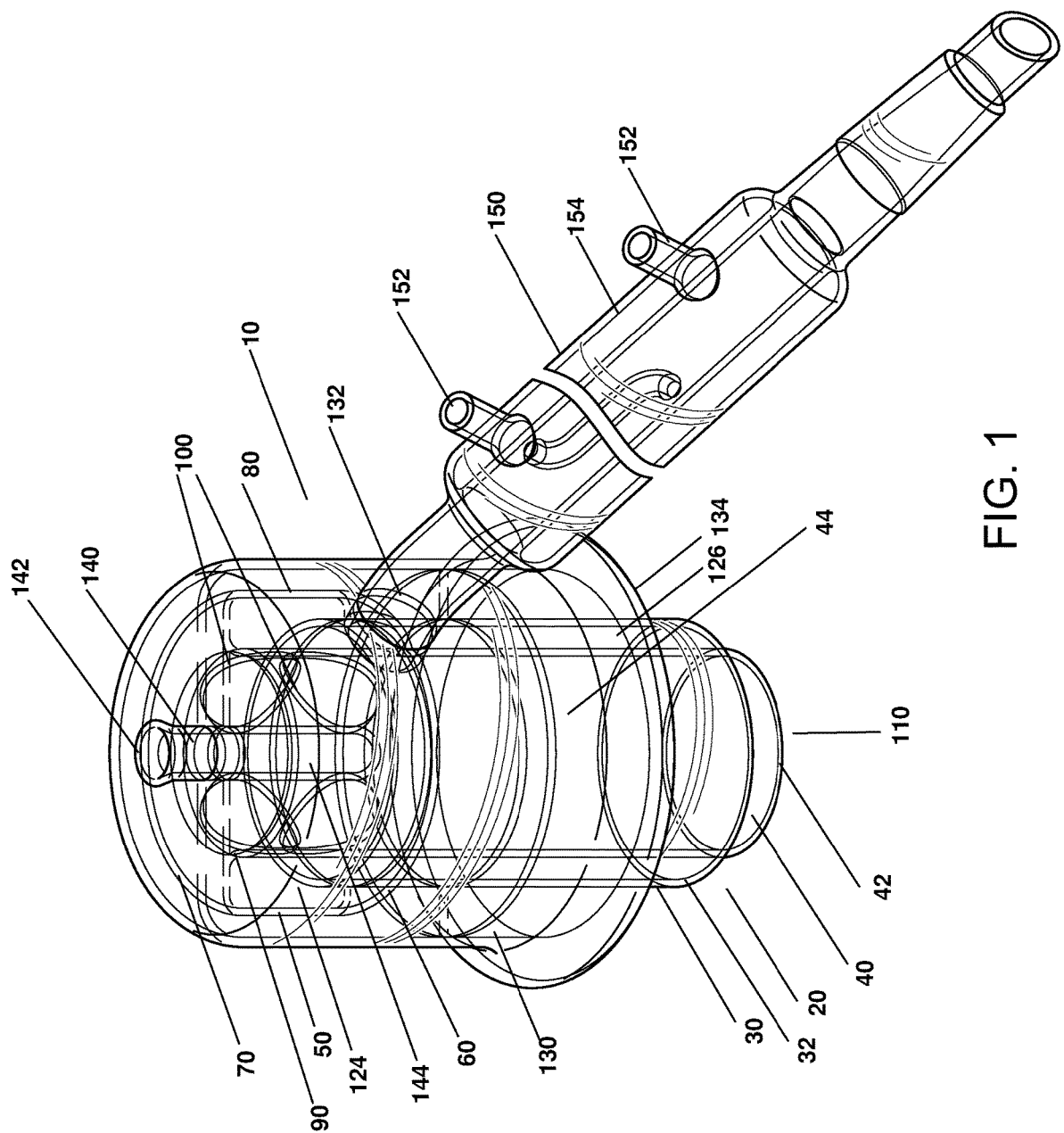
FIG. 1 is an upper perspective view of a distillation tube of embodiments of the disclosed technology.
Figure 2:
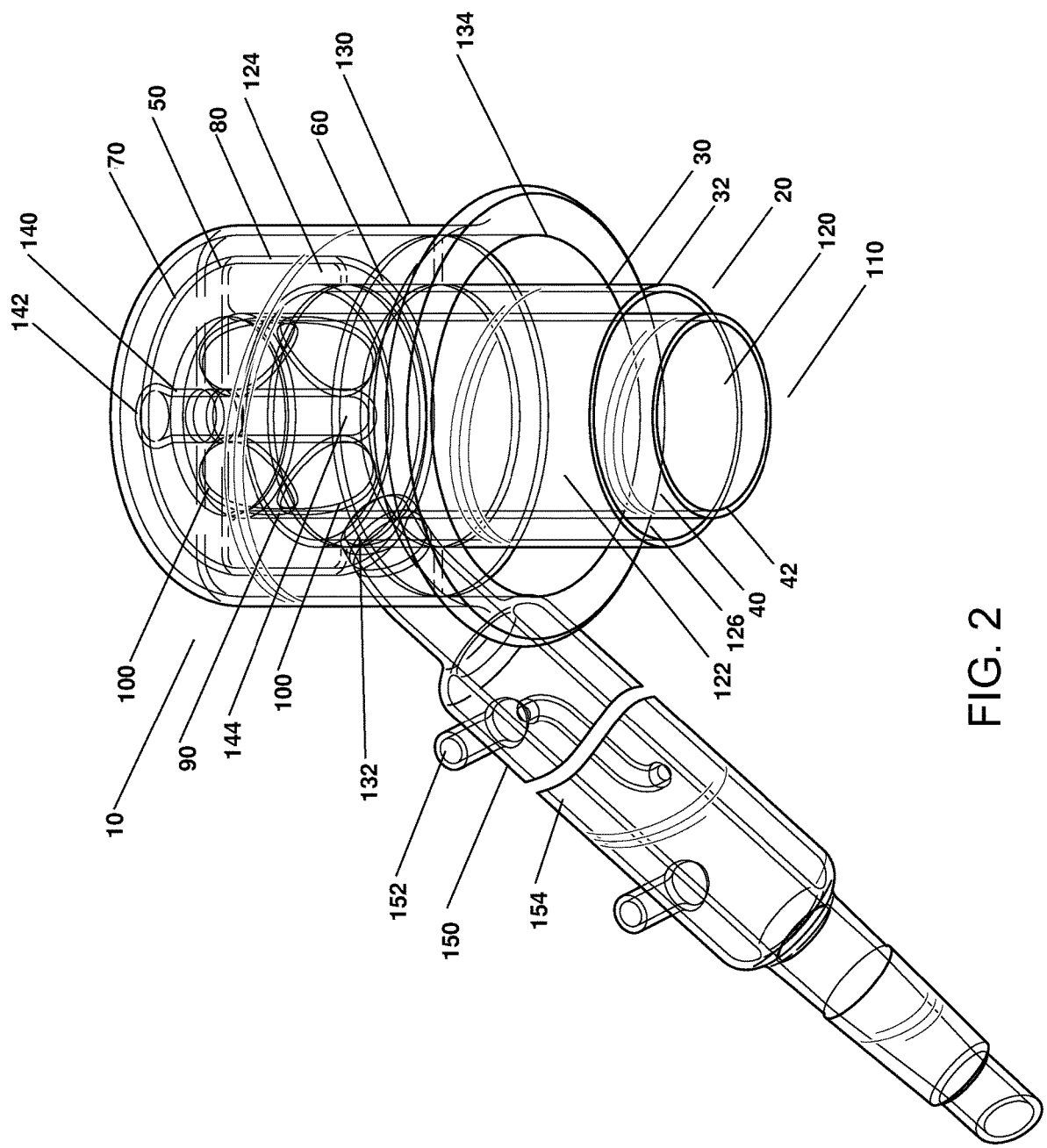
FIG. 2 is a lower perspective view of the distillation tube of FIG. 1.
Figure 3:
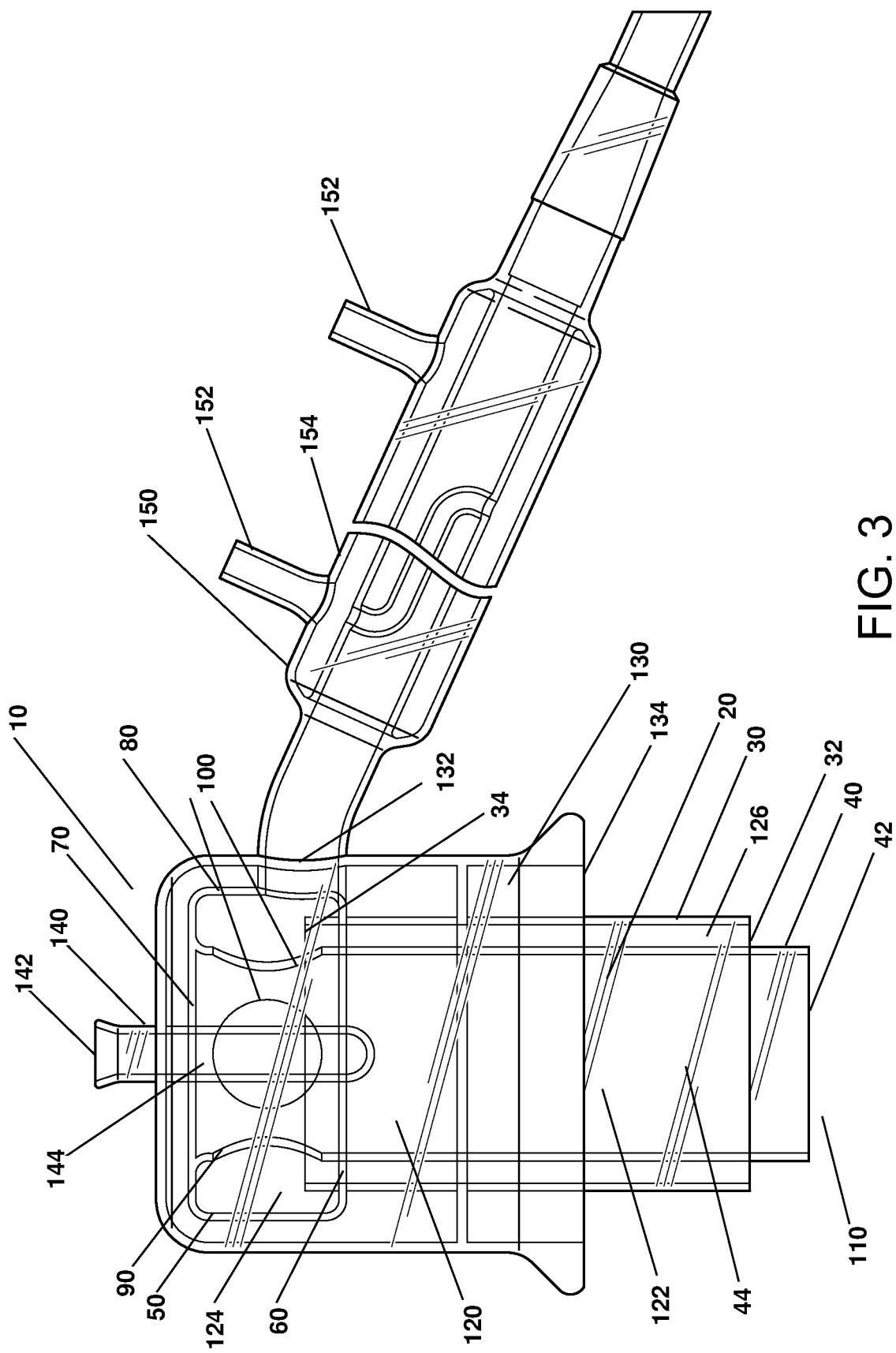
FIG. 3 is a front elevation view of the distillation tube of FIG. 1.

FIG. 1 is an upper perspective view of a distillation tube of embodiments of the disclosed technology. FIG. 2 is a lower perspective view of the distillation tube of FIG. 1. FIG. 3 is a front elevation view of the distillation tube of FIG. 1. A distillation tube 10 has an inner tube 40 within an outer tube 30, with a fraction collector 50 there-above. A lower opening 32 of the outer tube 30 and a lower opening 42 of the inner tube 40 are substantially circular in shape, are concentric, and lie in parallel horizontal planes. "Horizontal" is defined as a direction perpendicular to a longest extent of the distillation tube 10.

Stated differently, the lower openings 32, 42 of the tubes 30, 40 are substantially similar in shape, where "similar" is defined as having a substantially same shape as and having a different size than. The lower opening 42 of the outer wall 40 is in a horizontal plane substantially above the lower opening 32 of the inner wall 30.

The outer wall 30 terminates in an upper opening 34. The inner wall 40 terminates in a concave wall 90. Each horizontal cross-section of the concave wall 90 is substantially similar and substantially circular. Each vertical cross-section of the concave wall 90 is substantially identical and substantially curvilinear and/or arc-shaped, such that a midpoint thereof is more interior relative to the distillation tube 10 than an endpoint thereof. "Arc-shaped" is defined as having a shape of a portion of a circumference of a circle with a same radius throughout.

The concave wall 90 has therein at least one portal 100. In the embodiment show, the at least one portal 100 is four portals, each portal thereof being substantially circular in shape, with midpoints thereof located on a same circumference of the concave wall 90 and equidistantly spaced thereon. In other embodiments, the at least one portal 100 may be more or less than four portals. The at least one portal 100 may have a shape of any polygon, and may be located at any point or points on the concave wall 90.

In the embodiment shown, all of the concave wall 90, all of the upper opening 34 of the outer tube 30, an upper portion of the outer tube 30, and an upper portion of the inner tube 40 are surrounded by an outer wall 80 of the fraction collector 50. In various embodiments, any or all of the walls 30, 40 and the concave wall 90 may extend above and/or below the fraction collector 50. "Surrounded" is defined as having exterior to every part thereof in every horizontal cross-section thereof. It should be understood that the a side exit portal 82 of the outer wall 80 of the fraction collector 50 can also be considered a part thereof, and is thus is continuous and/or forming a unitary device in the fraction collector 50 surrounding all of the concave wall 90, all of the upper opening 34 of the outer tube 30, an upper portion of the outer tube 30, and an upper portion of the inner tube 40.

The fraction collector 50 is defined by a lower wall 60, an upper wall 70, and a side wall 80. In some embodiments, the side wall 80 may be multiple side walls. The upper wall 70 is solid but for an opening to accommodate a cooling channel 140. The upper wall 60 is solid but for an opening to accommodate the inner and outer walls 40, 30 of the vertical tube 20.

In the embodiment shown, the upper and lower walls 70, 60 are substantially circular and the accommodating openings are substantially concentric there-to and substantially circular. Stated differently, the upper and lower walls 70, 60 of the fraction collector 50 and the openings therein are arranged, in the embodiment shown, such that each point on an outer edge of the upper wall 70 is substantially a same distance apart from a nearest point on an outer edge of the opening to accommodate the cooling channel 140, and each point on an outer edge of the lower wall 60 is substantially a same distance apart from a nearest point on an outer edge of the opening to accommodate the vertical tube 20. In other embodiments, the openings may be placed on a different part of their respective walls 60, 70 of the fraction collector 50.

The upper and lower walls 70, 60 of the fraction collector 50 are each connected at outermost edges thereof to the sidewall 80 of the fraction collector 50. In the embodiment shown, the connections are by way of rounded corners; in other embodiments, the connections may be by way of right angles or angled connecting walls.

The fraction collector 50 is in a shape of a ring. "Ring" is defined as "a hollow region which at least surrounds at least a part of a vertically extending passageway of a distillation device" and/or "a rounded hollow shape whose outermost circumference and whose innermost circumference are concentric circles".

The cooling channel 140, in the embodiment shown, extends from an upper opening 142 to a point below the bottom wall 60 of the fraction collector 50. The upper opening 142 of the cooling channel 140 is, in the embodiment shown, a highest point of the distillation device 10. In the embodiment shown, the cooling channel 140 has a cylindrical shape with a flared upper opening 142 and a rounded lowest point. A majority of horizontal cross sections of the cooling channel 140 have a substantially circular shape with a substantially same radius thereof. In other embodiments, the cooling channel 140 may have a different shape, may have a same horizontal cross section throughout, and may have a closed and/or removably closable upper opening 142. The upper opening 142, in some embodiments, may be and/or also have a side opening.

FIG. 4 is a right side elevation view of the distillation tube of FIG. 1. FIG. 5 is a left side elevation view of the distillation tube of FIG. 1. In the embodiment shown, all of the fraction collector 50, and elements surrounded there-by, and a majority of the outer and inner walls 30, 40 are surrounded by an outer shell 130. The shell is unbroken but for a side portal 134, a lower portal 134, and an upper portal 136. It should be understood that the these portals of the outer shell 130 can also be considered parts thereof, and are thus not a break in the outer shell 130 surrounding all of the fraction collector 50, and elements surrounded there-by, and a majority of the outer and inner walls 30, 40.

The outer shell 130 has a substantially vertical rounded sidewall connected by way of a rounded edge to a substantially horizontal upper sidewall. A lowest portion of the substantially vertical rounded sidewall has an outwardly-flaring edge surrounding the lower portal 134. The substantially horizontal upper sidewall has an upper portal 136 through which the cooling channel 140 extends. In some embodiments, the substantially horizontal upper sidewall may be angled and/or curved.

Figure 6:
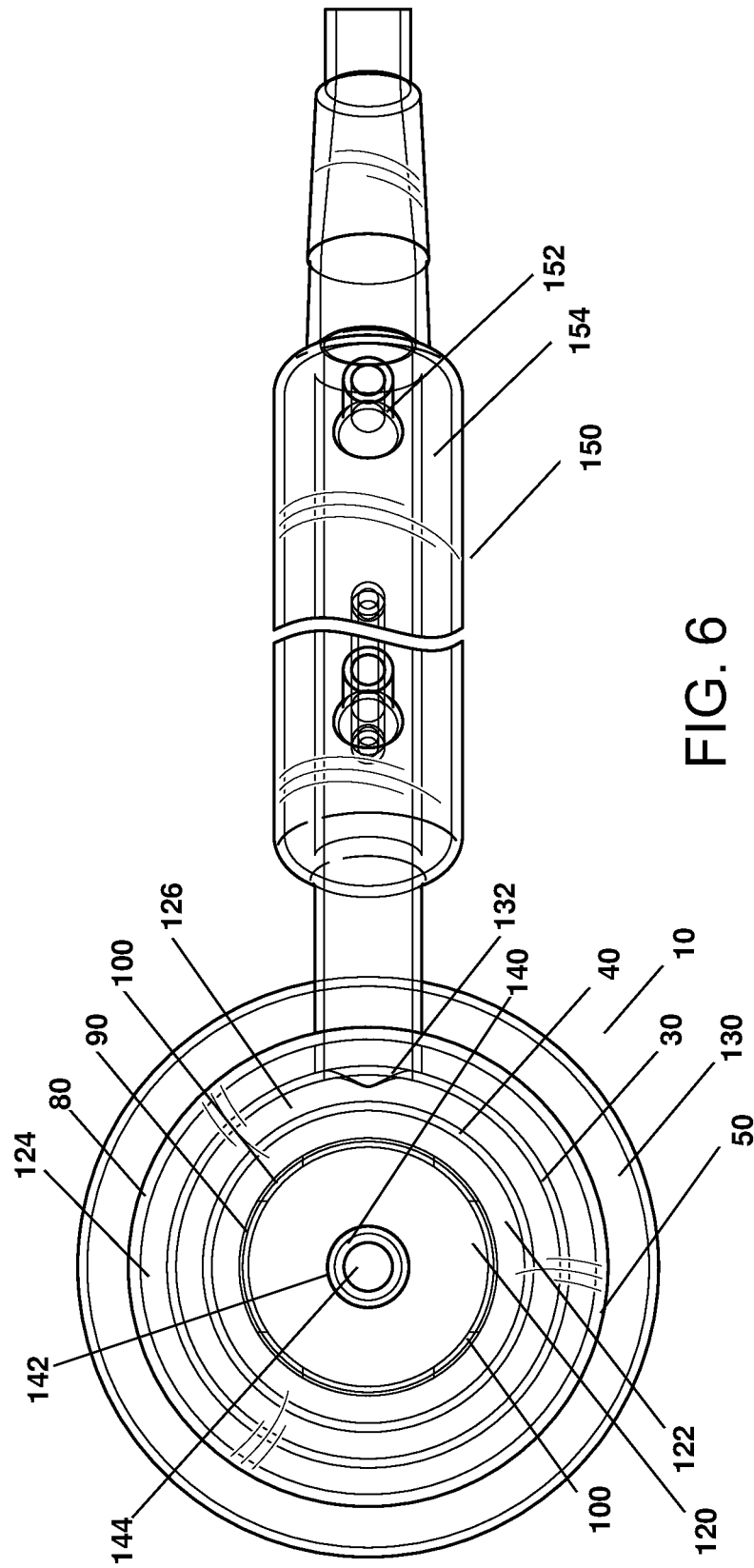
FIG. 6 is a top plan view of the distillation tube of FIG. 1.
Figure 7:
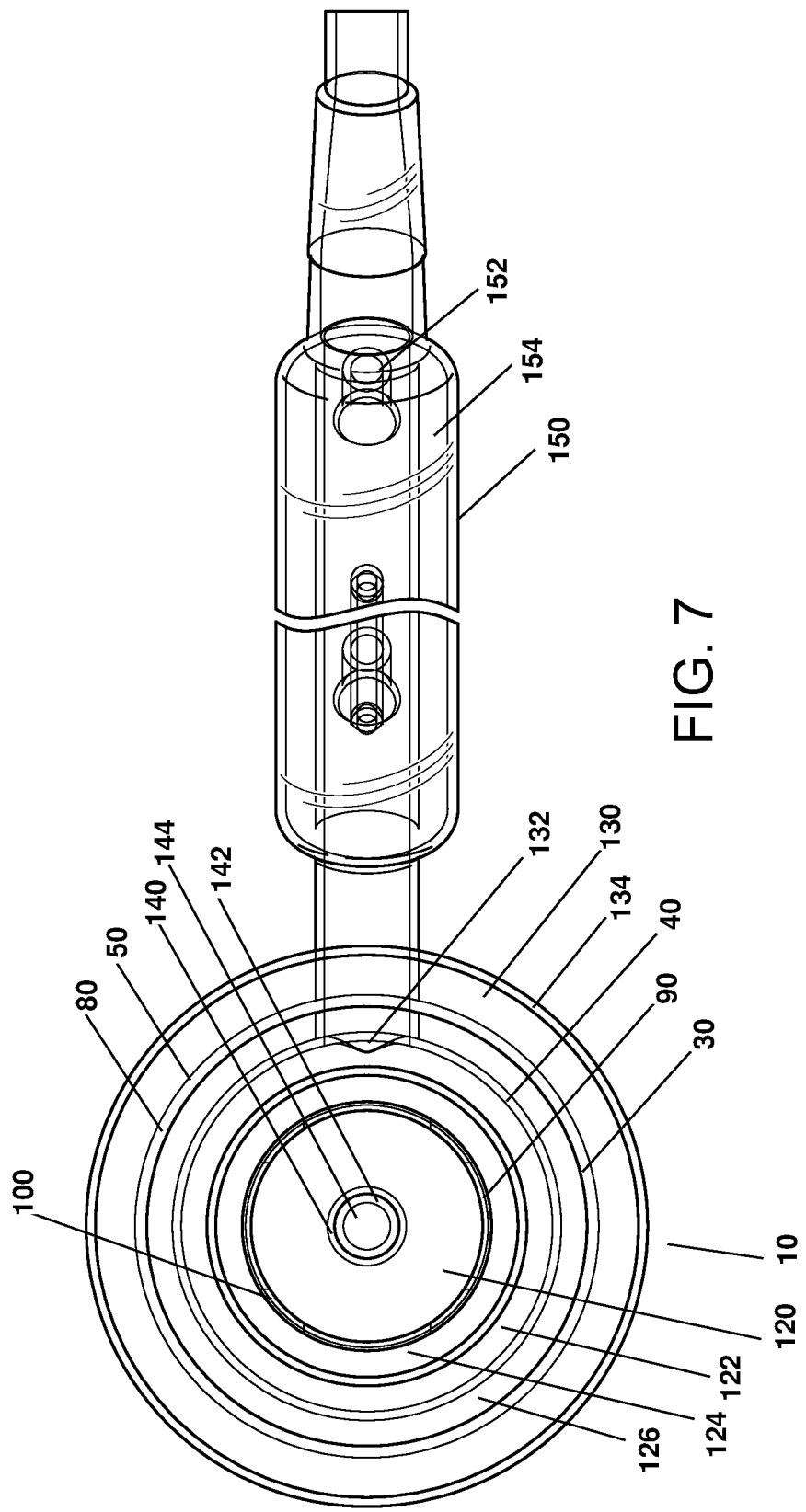
FIG. 7 is a bottom plan view of the distillation tube of FIG. 1.

FIG. 6 is a top plan view of the distillation tube of FIG. 1. FIG. 7 is a bottom plan view of the distillation tube of FIG. 1. As shown in the figures, in the embodiment shown, when viewed from the top and/or bottom, the flared rim surrounding the lower portal 134 of the outer shell 130 has a substantially circular circumference, which is a widest circumference of the distillation device 10.

From a same perspective, the sidewall 80 of the fraction collector 50 is similarly circular, and is concentric with the flared rim surrounding the lower portal 134 of the outer shell 130. In the embodiment shown, the sidewall 80 of the fraction collector 50 is a second-widest circumference of any elements of the distillation device 10.

From the same perspective, the outer wall 30 and the inner wall 40 of the vertical tube 20 are similarly circular, and are concentric with the flared rim surrounding the lower portal 134 of the outer shell 130. In the embodiment shown, the outer wall 30 of the vertical tube 20 is a third-widest circumference of, and the inner wall 40 of the vertical tube 20 is a fourth-widest circumference of any elements of the distillation device 10.

From the same perspective, an innermost horizontal cross-section of the concave wall 90 of the fraction collector 50 is similarly circular, and is concentric with the flared rim surrounding the lower portal 134 of the outer shell 130. In the embodiment shown, the innermost horizontal cross-section of the concave wall 90 of the fraction collector 50 is a fifth-widest circumference of any elements of the distillation device 10.

From the same perspective, a circumference of the cooling channel 140 is similarly circular, and is concentric with the flared rim surrounding the lower portal 134 of the outer shell 130. In the embodiment shown, the circumference of the cooling channel 140 is a sixth-widest circumference of any elements of the distillation device 10, and is simultaneously a smallest circumference of any element of the distillation device. In various embodiments, these various circumferences may be of other sizes, and may be otherwise larger or smaller than each other.

Figure 8:
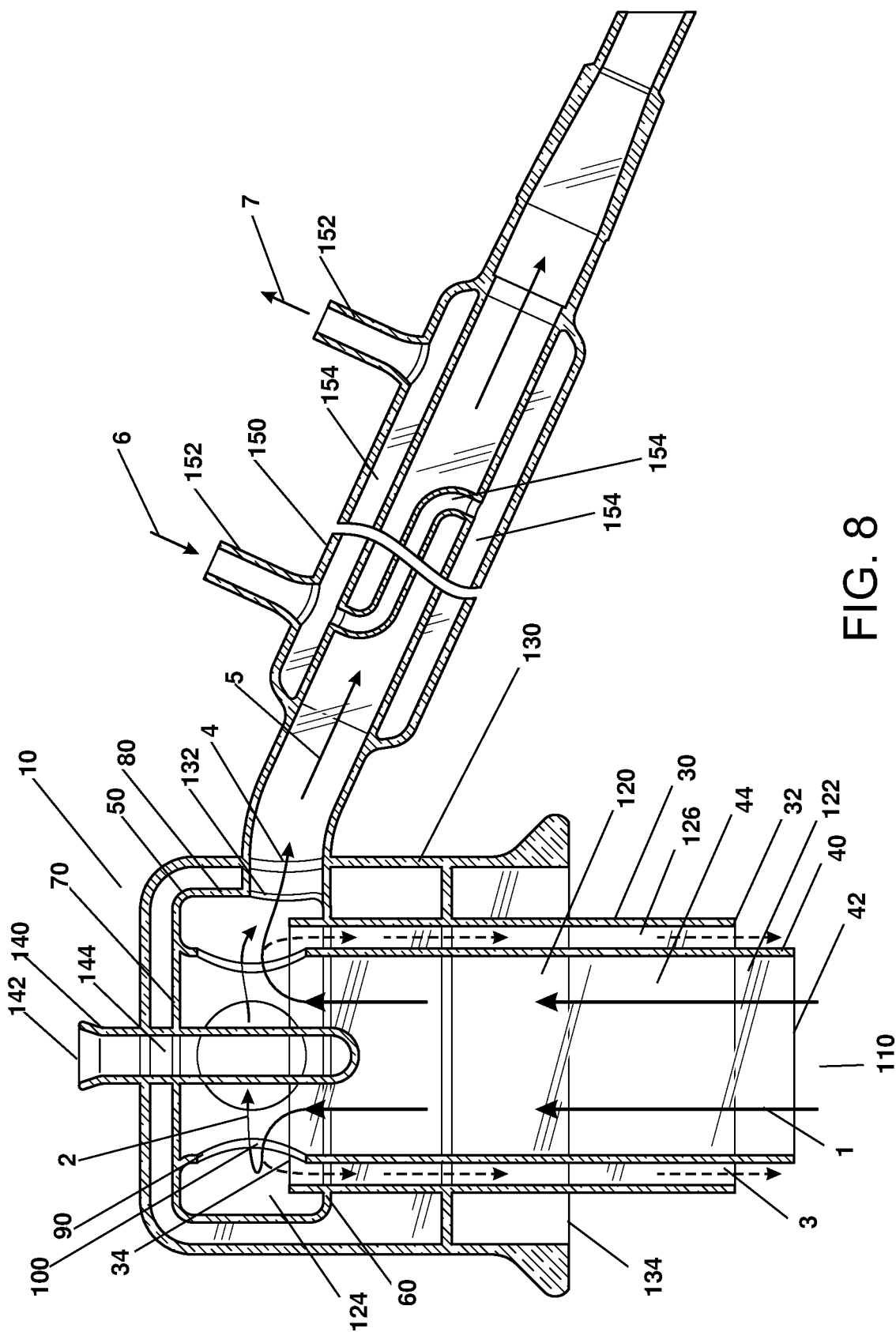
FIG. 8 is a side elevation view of the distillation tube of FIG. 1 with arrows showing air/liquid flow of a substance therein.

FIG. 8 is a side elevation view of the distillation tube of FIG. 1 with arrows showing air/liquid flow of a substance (such as vapors being distilled) therein. The distillation device 10 is sized to be placed over and around a boiling flask. In some embodiments, one or both of the walls 30, 40 of the vertical tube 20 extends into a liquid within the boiling flask. In other embodiments, one or both of the walls 30, 40 of the vertical tube 20 extends into an internal area of the boiling flask above an uppermost surface of the liquid within the boiling flask. An upper edge of the boiling flask may extend into an area above the lower portal 134 of the outer shell 130 and between the outer wall 30 of the vertical tube 20 and the outer shell 130. The outer shell 130, the outer wall 30 of the vertical tube 20, and the inner wall 40 of the vertical tube 20 may be of any lengths relative to one another so long as the lower opening 32 of the outer wall 30 is below the lower portal 134 of the outer shell 130 and is above the lower opening 42 of the inner wall 40.

When the liquid inside the boiling flask boils, a resulting vapor or distillate enters the distillation device 10 by way of an area 122 enclosed by the inner wall 40, along path 1. The vapor continues into an area enclosed by the concave wall 90 of the fraction collector 50 through which the cooling channel 140 extends. In the fraction collector, coolant, such as room temperature water or water below room temperature, within the cooling channel 140 cools the vapor, causing heavier particles within the vapor to be rejected and fall downwards. "Being rejected" or "rejection" refers to a phenomenon in which larger or cooler particles/vapors (relative to other particles being distilled) within a vapor fall downwards as part of a process of distillation.

The vapor within the area enclosed by the concave wall 90 of the fraction collector 50 through which the cooling channel 140 extends enters outer area 124 of the fraction collector 50 through portals 100 within the concave wall 90, along path 2. Heavier or cooler particles within the vapor are rejected and fall downwards by way of area 126 between the inner wall 40 and the outer wall 30 of the vertical tube 20, following path 3. It should be noted that the movement of vapor and/or distillate through the distillation device 10 is driven at least in part by rising hot air/vapor from the boiling flask in embodiments of the disclosed technology.

Non-rejected particles of the vapor exit the fraction collector 50 through the side exit portal 82 of the fraction collector, following path 4, and enter the condenser 150. Within a sidewall of the condenser 150 is a cooling path 154. A coolant, such as room temperature water, enters and/or the cooling path 154 by way of portals 152, following paths 6 and 7. The coolant thus cools the distillate within the condenser 150 while remaining substantially separate therefrom. The distillate follows path 5 through the condenser 150, cooling and condensing while doing so.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A distillation device comprising:
    a vertical tube with an outer wall and an inner wall, said outer wall surrounding a majority of said inner wall;
    a fraction collector extending above said vertical tube;
    an upper section of said inner wall and said outer wall of said vertical tube extending through a bottom side of said fraction collector and into a region of said fraction collector, said fraction collector being defined by at least a part of an upper wall, at least a part of a side wall, and at least a part of a bottom wall.

2. The distillation device of claim 1, wherein said inner wall continues into a concave wall, said concave wall continuing to said top side of said fraction collector.

3. The distillation device of claim 2, wherein said concave wall comprises at least one portal extending there-through.

4. The distillation device of claim 3, wherein a portion of an interior of said vertical tube defined by said inner wall and a portion of an interior of said fraction collector defined by said concave wall and said side wall of said fraction collector allow air and/or liquid flow between each other only through said at least one portal of said concave wall.

5. The distillation device of claim 4, wherein each of said inner wall and said outer wall surround respective concentric lower openings.

6. The distillation device of claim 5, wherein a space between said inner wall and said outer wall is open to said fraction collector and an exterior lower opening of said concentric lower openings.

7. The distillation device of claim 4, wherein a region of said fraction collector exterior to said concave wall opens into a region between said inner wall and said outer wall of said vertical tube, which, in turn, is open to a bottom side of said distillation device.

8. The distillation device of claim 3, wherein said outer wall of said vertical tube surrounds a part of said concave wall.

9. The distillation device of claim 8, wherein said inner wall of said vertical tube extends further downwards than said outer wall.

10. The distillation device of claim 9, wherein said outer wall of said vertical tube partially surrounds said at least one portal of said concave wall.

11. A distillation apparatus, comprising:
    a continuous inner wall with a vertical portion and a concave portion;
    at least one portal opening within said concave portion;
    a fraction collector surrounding said concave portion;
    an outer wall surrounding at least a majority of said inner wall; and
    at least one hollow space between said vertical portion and/or said concave portion of said continuous inner wall and said outer wall.

12. The distillation apparatus of claim 11, wherein a first opening of said at least one hollow space comprises an opening to said fraction collector exterior to said concave portion of said inner wall.

13. The distillation apparatus of claim 12, wherein a second opening of said at least one hollow space comprises an opening at a bottom of said distillation apparatus.

14. The distillation apparatus of claim 13, wherein an opening at a bottom end of said distillation apparatus circumscribed by said inner wall extends further downwards than said second opening at said bottom of said distillation apparatus.

15. The distillation apparatus of claim 11, further comprising a shell surrounding a part of said inner wall, a part of said outer wall, said fraction collector, and said concave portion.

16. The distillation apparatus of claim 15, wherein said shell has only two portals, namely, a lower portal and a side portal, wherein said side portal opens into said fraction collector.

17. The distillation apparatus of claim 11, further comprising a cooling channel, having a single portal open to a top side of said distillation apparatus and sealed from said fraction collector, which extends into a space defined by said fraction collector and at least a portion of said vertical tube.

* * * * *